Dec. 11, 1951 G. LAGARDELLE 2,578,561

INJECTION PUMP

Filed Oct. 27, 1945 9 Sheets-Sheet 1

INVENTOR
GERMAIN LAGARDELLE
BY [signature]
HIS ATT'Y

INVENTOR
GERMAIN LAGARDELLE
BY [signature]
HIS ATT'Y

INVENTOR
GERMAIN LAGARDELLE
BY Otto Munk
HIS ATTY

INVENTOR
GERMAIN LAGARDELLE
BY Otto Munk
HIS ATT'Y

INVENTOR
GERMAIN LAGARDELLE
BY [signature]
HIS ATT'Y

Dec. 11, 1951

G. LAGARDELLE

INJECTION PUMP 2,578,561

Filed Oct. 27, 1945

9 Sheets-Sheet 6

INVENTOR
GERMAIN LAGARDELLE
BY Otto Munk
HIS ATTY

Dec. 11, 1951 G. LAGARDELLE 2,578,561

INJECTION PUMP

Filed Oct. 27, 1945 9 Sheets-Sheet 7

INVENTOR
GERMAIN LAGARDELLE
BY [signature]
HIS ATTY

Dec. 11, 1951

G. LAGARDELLE 2,578,561

INJECTION PUMP

Filed Oct. 27, 1945

9 Sheets-Sheet 8

INVENTOR
GERMAIN LAGARDELLE
BY [signature]
HIS ATTY

INVENTOR
GERMAIN LAGARDELLE
BY [signature]
HIS ATTY

Patented Dec. 11, 1951 2,578,561

UNITED STATES PATENT OFFICE 2,578,561

INJECTION PUMP

Germain Lagardelle, Colombes, France, assignor to Ateliers de Construction Lavalette, Saint-Ouen, Seine, France, a joint-stock company of France Application October 27, 1945, Serial No. 625,036
In France April 18, 1944

Section 1, Public Law 690, August 8, 1946
Patent expires April 18, 1964

7 Claims. (Cl. 103—37)

This invention relates to improvements in and or relating to injection pumps.

Injection pumps comprising a plurality of delivery plunger pistons discharging liquid fuels and sliding in cylinders are already known. The reciprocating motion of said pistons is controlled by a movable rocking plate rocking about its centre under the effect of the rotation of the driving shaft.

The adjustment of the delivery or of the output is obtained through an axial sliding of the movable plate, the position of which acts upon the useful stroke of the plunger pistons.

Said pumps have various disadvantages and more particularly the following ones:

(1) The adjustment of the stroke of the delivery pistons is made by hand and depends entirely on the skilfulness of the operator which, accordingly, affects the efficiency of the engine.

(2) Said pumps are not well adapted for the use of any fuel.

(3) When the engine is stopped the pump does not come to rest immediately, which results in a complementary loss of fuel.

The present invention has for its object to provide an injection pump making it possible to remedy said disadvantages by a self-adjustment of the injection in function of the output of the engine, the quantity of injected fuel thus always corresponding to the optimum value which is a function of the working speed of the engine, thus making it possible to improve the efficiency of said engine irrespectively of its working speed.

The injection pump according to the invention also has for its object to yield liquid fuel delivery curves parallel with one another and hence to adapt the self-adjustment of the injection pump to the various fuels.

The injection pump according to the invention has also for its object to permit an easy adjustment to any engine and the reduction of the rubbing effect resulting from the relative displacement of the members which are in contact while allowing a large saving of lubricating oil.

Injection pumps making it possible to attain the preceding objects will be readily understood from the following description and, more particularly, from the appended claims.

Injection pumps according to the invention are shown in the appended drawings by way of example. In said drawings Figure 1 is a sectional longitudinal view of a first embodiment of an injection pump.

Figure 1:
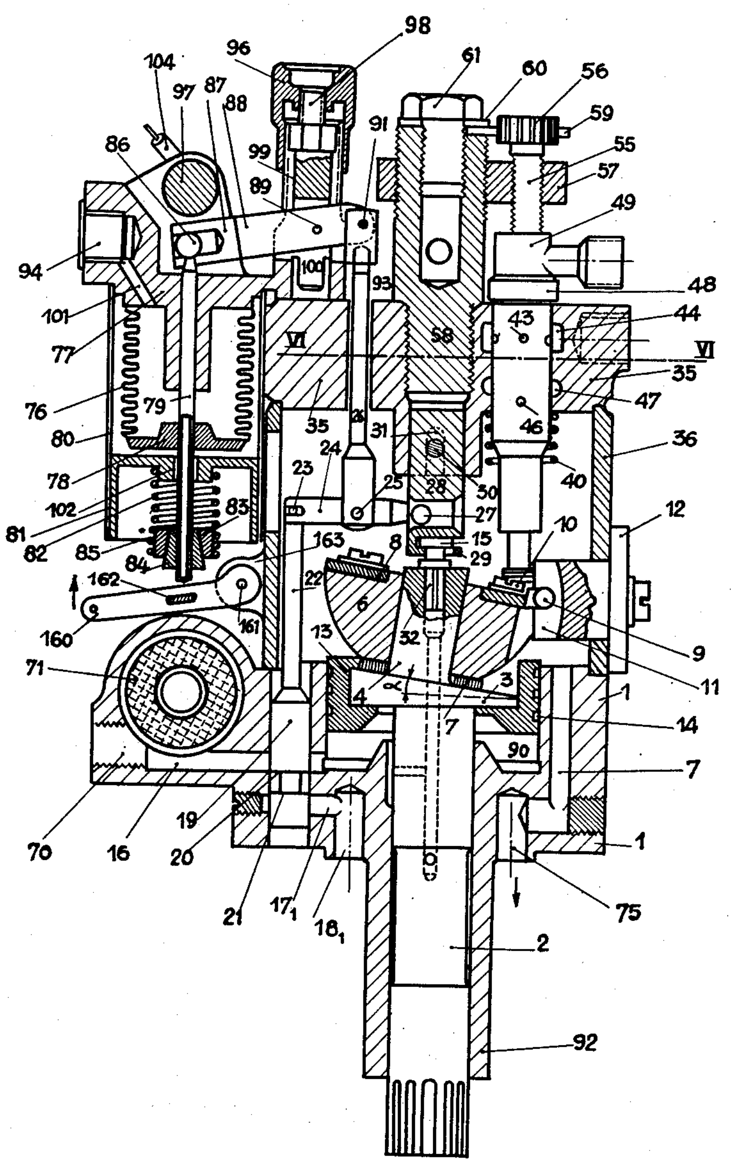

The pump shown in its entirety in Figure 1 comprises the following main groups of members:

(1) The pump proper with the housing for the plunger piston, the actuating device for the actuation of the pump through the rotation of the shaft and the device for the adjustment of the plunger pistons.

(2) The automatic control device for the variation of the output in function of the engine.

(3) The device for the adjustment of the output variation and of the output when the engine is slowed down.

(4) The device for adjusting the output in function of the engine for which the pump is used.

(5) The control device for stopping the pump immediately.

(6) The lubricating device for the various elements of the pump.

The pump proper comprises cylindrical bores in which the cylinders $38^1$, $38^2$, $38^3$, $38^4$ are mounted concentrically in which the delivery pistons $39^1$, $39^2$, $39^3$, $39^4$ slide. The head of each delivery piston comprises a seat 41 on which a compression spring 40 rests; the other end of the compression spring 40 rests on the lower face of the housing 35.

The housing 35 forms the cover of the casing 1 of the injection pump.

Said casing terminates in a sleeve 92 in which the driving shaft 2 can rotate freely and slide axially. Said driving shaft 2 terminates in a flange 3 one face of which is perpendicular to the oblique axis of the oblique plate 6.

The oblique face is surmounted by a journal 4 which is perpendicular to said face. On the journal 4 is mounted a rocking plate 6 covered with a case-hardened plate 8.

The piston rods of the plunger pistons $39^1$, $39^2$, $39^3$, $39^4$ come constantly under the action of the spring 40 to rest against the case-hardened plate 8. The rocking plate rests upon the oblique face of the flange through the medium of the washer 7.

The rotation of the plate 6 is prevented by a ball 9 cut out of a cover plate 8. Said ball 9 slides during the movements of inclination of the plate 6 in the guiding slot 11 of a support 12 secured to the pump body.

The pistons are actuated in the following manner.

The rotation of the shaft 2 causes, on the one hand, the rotation of the journal 4 and, on the other hand, the rocking of the oblique plate 6, owing to the fact that said plate is held fast in the direction of the periphery. The head of each piston $39^1$, $39^2$, $39^3$, $39^4$ rests constantly upon the face of the oblique plate which imparts to it a reciprocating up and down motion in function of the rocking of the plate 6.

The angle $\alpha$ which both faces of the flange 3 form with each other corresponds to one half of the angle effectuated by the plate 6 when the journal 4 has made a complete revolution. The rotation of the journal 4 about the oblique axis causes, therefore, the rocking of the plate 6 by an amplitude equal to $2\alpha$.

This rocking movement which is displaced in all the planes passing through the shaft 2 raises one after another the pistons 39, the hemispherical head 42 of which constantly rests upon the surface of said plate under the action of the spring 40.

For adjusting the useful stroke of the delivery pistons $39^1$, $39^2$, $39^3$, $39^4$ one changes the height of plate 6. To this end the shaft 2 can slide in the sleeve 92.

The sliding movement of shaft 2 is controlled in the following manner in function of the partial vacuum in the engine (see Figure 1).

A piston 13 is forcibly fitted on the flange 3 and rotates with said flange. Said piston 13 is provided with grooves forming an expansion chamber and can slide in that part of the base 1 which serves as a cylinder for said piston. With the upper face of the base, said piston forms a variable space 90. Said space 90 is supplied with oil under pressure arriving through a pipe branch 16 connected with the forcing pump through the medium of the threaded connecting piece fitting into the tapped opening 70.

The oil feeding conduit 16 passes through a cylinder in which a distributing slide-valve slides. Said slide-valve is formed of a plunger provided with an annular chamber 20, putting the conduit 16 in communication with the chamber 90 or, on the contrary, the chamber 90 with the passage 17 for evacuating the oil under pressure. Thus, according to the position of the slide-valve, oil under pressure is led to the chamber 90, or said chamber 90 is insulated and separated from any supply, or said space 90 is put in communication with the outside.

Figure 3:
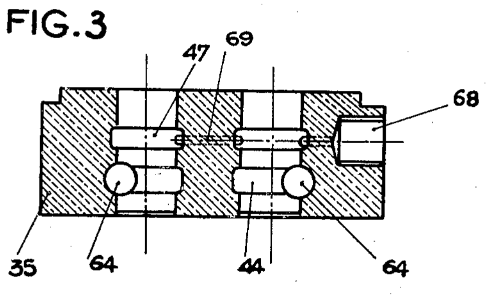
Figure 3 is a sectional view through the recesses of the pump element showing the passages supplying the fuel and the oil for the lubrication of the piston.
Figure 4:
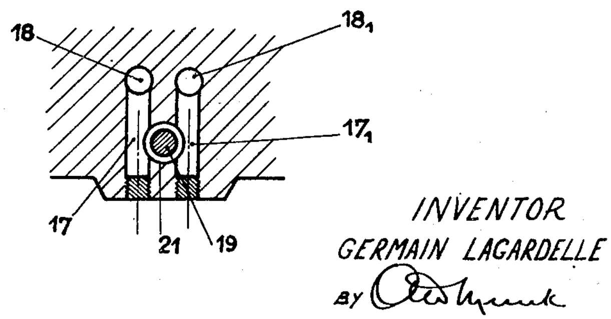
Figure 4 is a sectional view showing the oil evacuating device for adjusting the position of the plunger piston.
Figure 5:
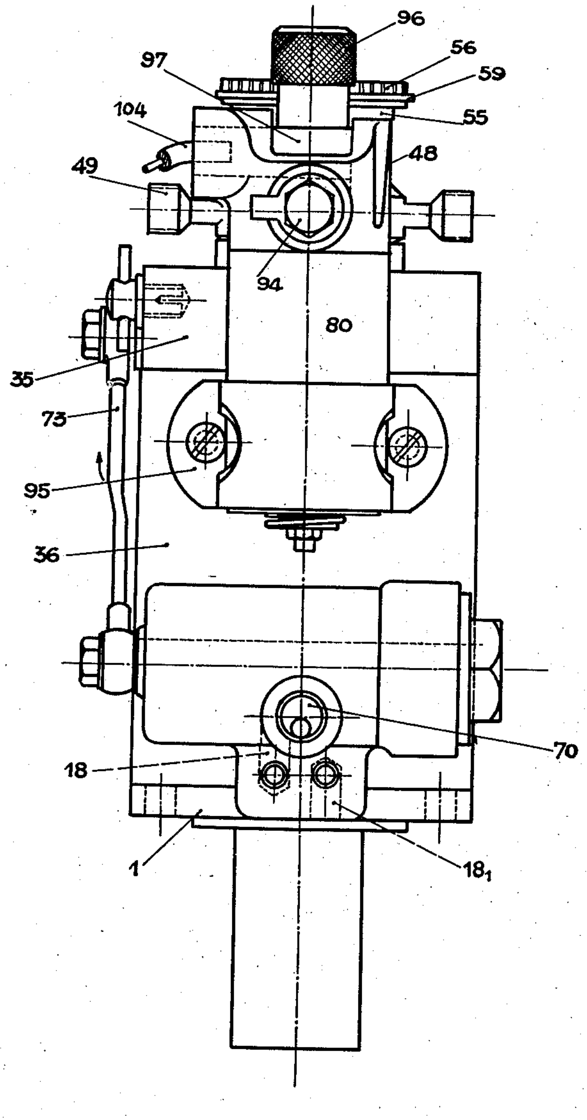
Figure 5 is a side view of the injection pump shown in Figures 1 and 2.
Figure 6:
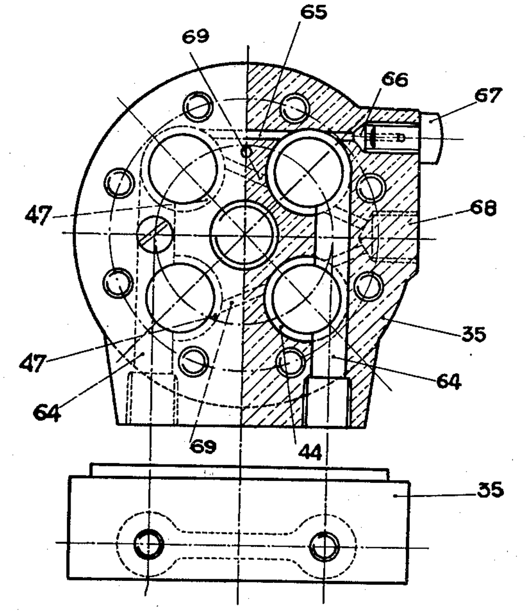
Figure 6 is a partial sectional horizontal view showing the pump of Figure 1 through the line VI—VI of said figure.
Figure 7:
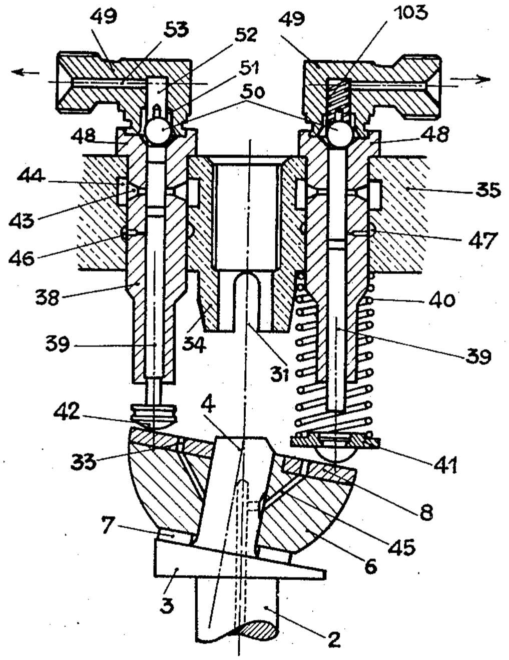
Figure 7 is a sectional longitudinal view showing the plunger pistons of the pump with their cylinders as well as the device for the motion controlling the plunger piston of the pump.
Figure 8:
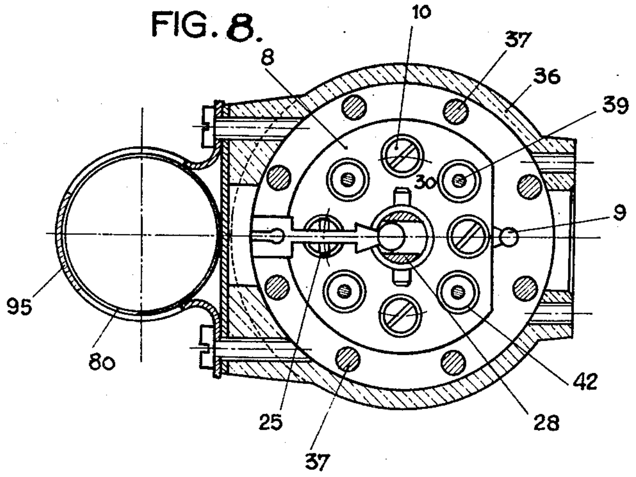
Figure 8 is a plan view showing the device for the assembly of the cylinders of the pump.
Figure 9:
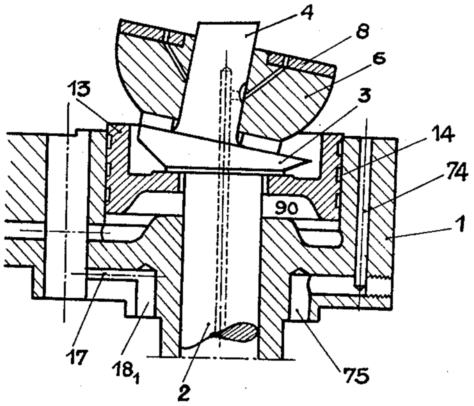
Figure 9 is a sectional elevational longitudinal view showing another embodiment for the control of the movement of the plunger piston.
Figure 11:
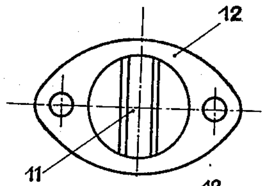
Figure 11 shows the locking groove for the oblique plate.
Figure 12:
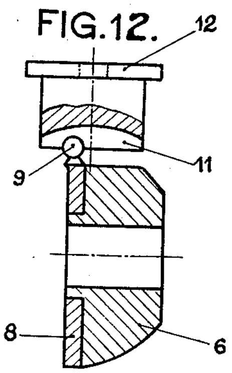
Figure 12 is a partial sectional view showing the locking device for the oblique plate of Figure 10 through the line XII—XII of said figure.
Figure 10:
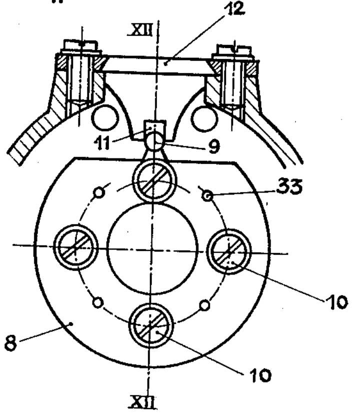
Figure 10 shows the locking device for locking the rotation of the oblique plate.

This device for the adjustment of the useful stroke of the delivery pistons $39^1$, $39^2$, $39^3$, $39^4$ works as follows:

When the annular space 20 of the slide-valve puts the conduit 16 in communication with the chamber 90, the oil under pressure runs into said chamber 90. The pressure of the oil causes the piston 13 which is fast with the shaft 2 to move back. The piston 13 is carried along the rocking plate 6 upwardly so that each plunger piston $39^1$, $39^2$, $39^3$, $39^4$ lies flush with the suction openings 43 of its cylinder 38. This is the maximum feeding position shown in Figures 3 and 9.

When the slide-valve 19 closes the chamber 90, the rocking plate 6 remains in the adjusting position.

When the distributing slide-valve 19 puts the chamber 90 in communication with the outside through the pipings 17, the oil contained in chamber 90 is evacuated and the piston 13 slides downwards.

Thus, the rocking plate 6 is carried along downwardly. Owing to this fact the plunger pistons $39^1$, $39^2$, $39^3$, $39^4$ slide downwards in their respective cylinders 38 whereby the useful stroke of said delivery plunger pistons is reduced.

Thus, the position of the oblique plate 6 actuated by the distributing slide-valve 19 controls the useful delivery stroke of the plunger pistons $39^1$, $39^2$, $39^3$, $39^4$ and hence the fuel quantity supplied by each delivery stroke of said piston 39.

For adjusting the useful delivery stroke of the piston in function of the partial vacuum in the engine, the position of the distributing slide-valve 19 is controlled, on the one hand by the partial vacuum in the engine acting with the manometric diaphragm 76 and, on the other hand, by the position of the oblique plate 6. Said device is made in the following manner.

A manometric diaphragm 76 communicates through a pipe branch 101 with the piping 94 connected with the suction of the engine. Said manometric diaphragm is submitted, on the one hand, to the atmospheric pressure and, on the other hand, to the partial vacuum in the engine and becomes deformed in function of the partial vacuum in the engine.

A rod 79 is interdependent with the displacement of the manometric diaphragm. Said rod 79 terminates in a ball 86 engaging the end 87 of a rocking device 88. Said rocker 88 is linked on a rotary axis 89 mounted on a yoke 98. That end of the rocker 88 which is opposed to the ball 86 is linked on an axis 91 mounted on the yoke 93. Said yoke 93 is fast with a rod 26 which slides in an opening provided in the housing 35 of the pump.

The rod 26 terminates in a yoke in which is linked a rocker 24 which controls the position of the oblique plate 6. To this end, the rocker 24 terminates in a ball 27 resting in a recess 28 interdependent with the up and down movement of the movable plate 6.

The other end of the rocker 24 is provided with a fork in which a rod 22 fast with the slide-valve 21 is linked by an axis 23.

Said device works as follows:

Under the effect of the partial vacuum in the engine the manometric diaphragm 76 is contracted upwardly and carries along in its movement the rod 79. Said rod 79 causes the rocker 88 to rock which by means of the rod 26 displaces the linking point 25 of the rocker 24 downwardly.

The movement of the rocker causes through the rod 22 the downward movement of the distributing slide-valve 19. In its downward movement the distributing slide-valve 19 puts the passage 17 in communication with the chamber 96. Thus the oil is evacuated and the oblique plate 6 slides downwards which reduces the useful stroke of the plungers $39^1$, $39^2$, $39^3$, $39^4$.

The action of the adjusting device for the injection pump in function of the partial vacuum in the engine must intervene in function of the preceding position of the oblique plate 6.

For this purpose, during its downward movement the piston 13 carries with it the rocking plate 6; said rocking plate 6 controls through the medium of the fork 29 the ball 27 resting in the recess 28. In its downward movement the rocking plate 6 thus carries with it the rocker 24. Said rocker turns about its axis 25 the position of which is a function of the position of the diaphragm controlling the partial vacuum in the engine. Then the distributing slide-valve 19 rises again till a point of equilibrium which corresponds to the simultaneous closure of the passages 16 and 17.

The self-variation of the supplied fuel quantities in function of the air sucked in by the engine is effected through recording the partial vacuum in the suction pipe of the engine by means of a venturi. Said venturi is connected with the opening 94. The partial vacuum acts on the diaphragm 76 through the passage 101. To each position of the diaphragm 76 corresponds a predetermined position of the slide-valve 19 and hence a predetermined position of the piston 13 and of the rocking plate 6 which controls the fuel supply for the engine.

The adjustment by hand of the output in function of the fuel which is used and the self-adjustment of the supply when the engine is slowed down are effected through changing the position of the pivoting axis 89 of the rocker 86 connected with the manometric diaphragm 76.

To this end a slide 98 comprises in its lower part a yoke receiving the linked axis 89 of the rocker 86. Said yoke has a hexagonal profile and slides freely in a hexagonal recess of the support 99. Said support 99 is slotted longitudinally for allowing the rocker 88 to pass. The end 100 of the yoke strikes against the lid 35 of the pump for limiting the adjustment to the desired range. In its upper part the slide 98 terminates in a threaded rod on which a control knob 96 is threaded. On the other hand said control rod is threaded outside the support 88. The pitch of the support 88 differs from that of the threaded rod of the slide, so that the displacement transmitted to the slide when turning the button is a function of the difference of both pitches; thus, a simple infinitesimal adjustment is made possible.

During the displacement of the slide 98 resulting in the displacement of the rocker 88, the latter rests on the ball 86 and causes the displacements of the rod 26 of the distributing slide-valve 19. It is thus possible to vary the position of the piston 13 for the adjustment of the position of the oblique plate 6 which controls the useful stroke of the plunger pistons of the pump. Thus, output curves are obtained which are parallel with one another and which give more or less strong outputs for a predetermined position of the manometric diaphragm. Thus this arrangement makes it possible to easily adapt the pump to any fuel.

The device for adjusting the optimum output of the engine on which the injection pump is used is made in the following manner:

The manometric diaphragm 76 is urged, on the one hand, by the partial vacuum in the engine and, on the other hand, by a compensating spring 82; said spring is secured to the end of the rod 79 of the manometric diaphragm 76. One of the ends of said spring 82 is centered by friction on a collar 102 which closes the bottom of the capsule 80 containing the manometric diaphragm 76; said collar 102 brakes said compensating spring against any movement of rotation about its axis.

The other end of the compensating spring 82 is threaded into a cap 83. Said cap 83 supports the spring by the action of a conical nut 84 threaded onto the threaded part 85 terminating the rod 79. The nut 84 is braked against any rotation by the cap 83 which is braked itself by the tension of the turns 82 secured on its periphery.

For adjusting the sensibility of the manometric diaphragm 76 one varies:

(1) the tension of the spring by screwing the conical nut 84, (2) the flexibility of the spring by screwing the cap 83 into the spring 82.

Thus, more or less slope is given to the output curves and hence the proportional relation between the delivery of the pump and the pressure of the engine is varied. This makes it possible to adapt the injection pump to the engine on which it is mounted.

Figure 2:
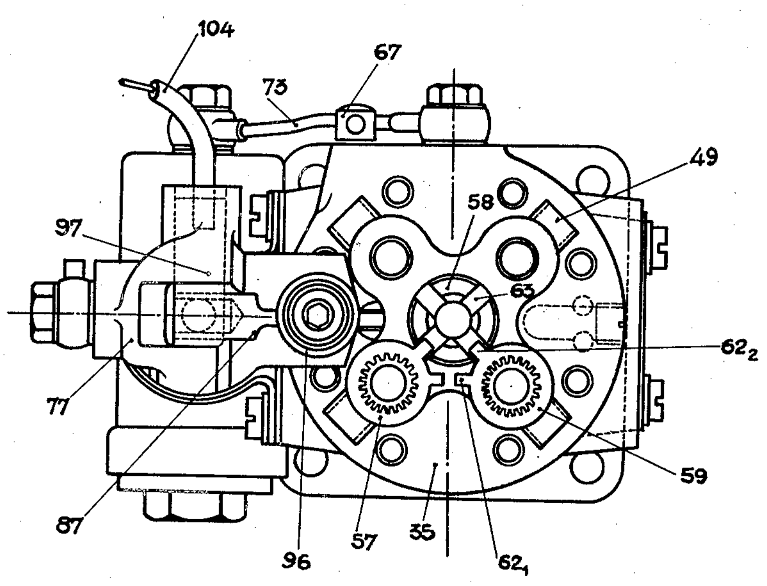
Figure 2 is a plan view of the pump of Figure 1.

The device for adjusting the optimum output whatever may be the engine on which the injection pump is used is made in the following manner: The stroke of the rocker 88 is limited by a stop 97 (Figures 1 and 2). Said stop 97 is formed of a plunger sliding transversely above the rod 79 of the manometric diaphragm 76 in an ear of the lid 77. In the stopping position, the end of the plunger 97 comes into contact with the ear of the lid 77 opposite that in which it slides. Thus the rocking of the rocker 88 is limited. Owing to this fact, at the moment of starting the engine, when the manometric diaphragm tends to contract under the action of a high partial vacuum, its stroke is arrested by the plunger 97. This prevents, as already mentioned previously, the return of the oblique plate 6 to its position corresponding to a small output. This results in a momentary enrichment of the fuel mixture until the engine is well off. The control of the plunger 97 is obtained by means of a Bowden cable 104 connected with a hand control lever on the control board. On pushing the hand lever the plunger 97 enters its recess again and uncovers the rocker 88 which takes its full rocking amplitude again.

The device for immediately stopping the pump is made in the following manner: a lever 160 is linked about an axis 161 mounted on the yoke 163. Said lever 160 can come into contact with the rod 85 of the manometric diaphragm 76, said contact being effected by the cross-piece 162 of the lever. It is thus possible to raise the diaphragm by pulling the lever 160 by means of any transmission device such as a rod or a Bowden cable. The diaphragm is thus locked in its position corresponding to the maximum partial vacuum which automatically controls, as indicated previously, the position of the movable plate 6 corresponding to the output zero of the plunger pistons.

The invention covers the above described pump whatever may be the particular form of operation of the various elements forming said pump. However, the invention also covers an injection pump according to the above description and in which the various elements forming said pump are mounted in the following manner.

Figure 13:
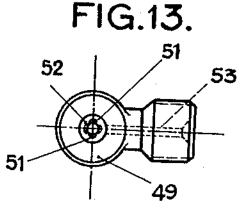
Figure 13 shows the passages discharging the fuel into the delivery pipe.

Each cylinder 38 in which the pistons 39 slide comprises in its upper part a collar resting on the lid 35 of the pump. The delivery pipe 48 is mounted on the collar of the cylinder 38. Said pipe contains a ball 50 urged by a spring 103 and acting as a delivery valve on the top of the cylinder. The delivery passage 53 is directed perpendicularly or obliquely with respect to the axis of the cylinder 38. The recess 52 is provided with channels 51 (Figure 13) surrounding the ball 50 of the valve. Said channels 51 brake the passage of the fuel, which makes it possible to keep a proportionality of the output by an increase of the speed.

The delivery pipe is applied against the cylinder 38 through a screw 55. Said screw is threaded into a cross-piece 57, itself threaded onto the central post 58 of the pump. This removable assembly facilitates the cleaning and the evacuation of the air. The screw 55 comprises a head 56 provided with channels. The brake 59 formed of a disc with inner notches engages said head 56 (Figures 1 and 2), the inner notches entering the channels of said head 56. On the outside, said brake 59 comprises two noses $62^1$ and $62^2$. Said noses $62^1$ and $62^2$ engage a slot 63 in the central knob 58. A washer 60 is maintained by a nut 61. Said washer applies each one of the brakes 59 of each cylinder 38 into their respective groove and prevents every unlocking of the cylinders 38 in the housing 35.

The above described injection pump offers numerous advantages and more particularly the following ones:

(1) The self-control of the output variation in function of the partial vacuum in the engine makes it possible to supply the engine with the quantity of fuel which is strictly necessary for its working at a given speed and hence to increase the efficiency of the engine.

(2) The device for the adjustment of the action of the manometric diaphragm controlling the partial vacuum of the engine makes it possible to adapt the pump to any engine.

(3) The device for the adjustment of the relative positions of the distributing slide-valve 19 and of the oblique plate 6 controlling the stroke and the delivery of the pistons of the pump makes it possible to adapt the engine to any fuel.

(4) The maximum fuel delivery is automatically fixed during the starting period of the engine.

(5) The standstill of the injection pump can be obtained instantaneously at the same time as the standstill of the engine, which avoids any complementary loss of fuel.

(6) The elements of the pump are secured in an easily removable manner, which facilitates their cleaning and the evacuation of the air.

The invention also covers an injection pump for the injection in pulsations comprising adjusting devices similar to those of the injection pump which has been described previously.

Figures 15, 16:
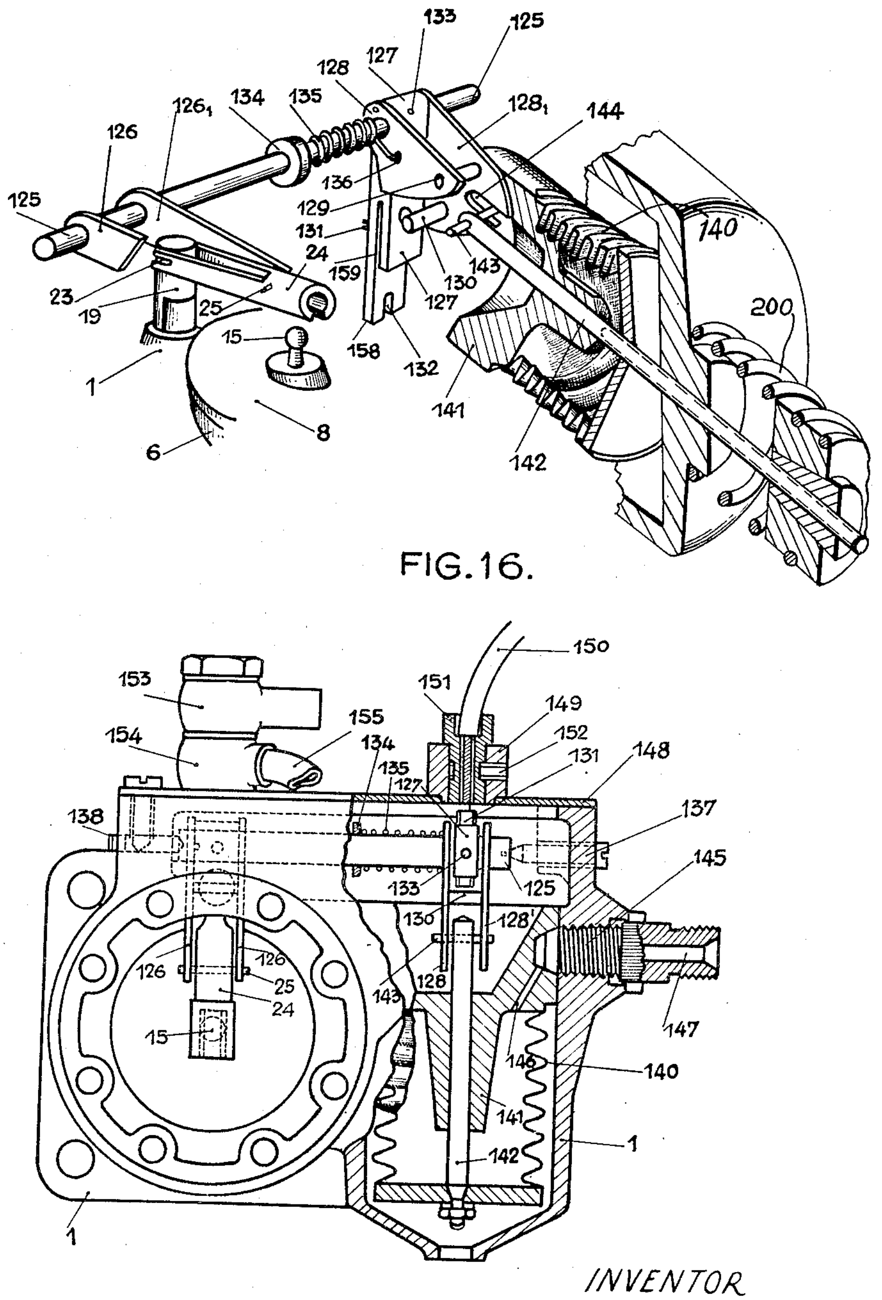
Figure 15 is a perspective view showing the actuating device for the slide-valve for adjusting the position of the oblique plate actuating the plunger piston.
Figure 16 is a partial sectional plan view showing the actuating device for the slide-valve of the preceding figure.
Figure 17:
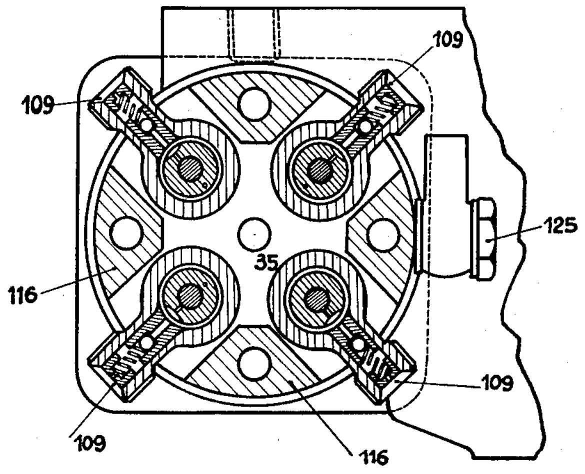
Figure 17 is a sectional plan view showing the arrangement of the forcing pump of Figure 14 through the line XVII—XVII of said figure.
Figure 18:
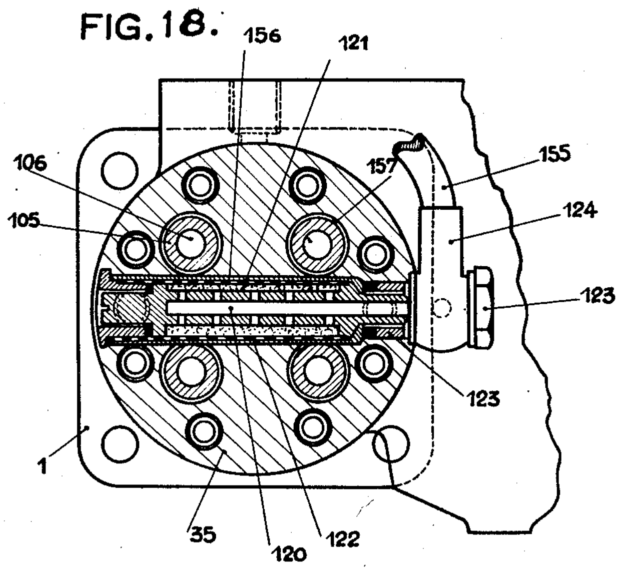
Figure 18 is a sectional plan view showing the pump of Figure 15 through the line XVIII—XVIII of said figure.

Said injection pump is shown in Figures 16 to 18. It comprises a housing in which are located four pump bodies each one of which is formed in the following manner.

Figure 14:
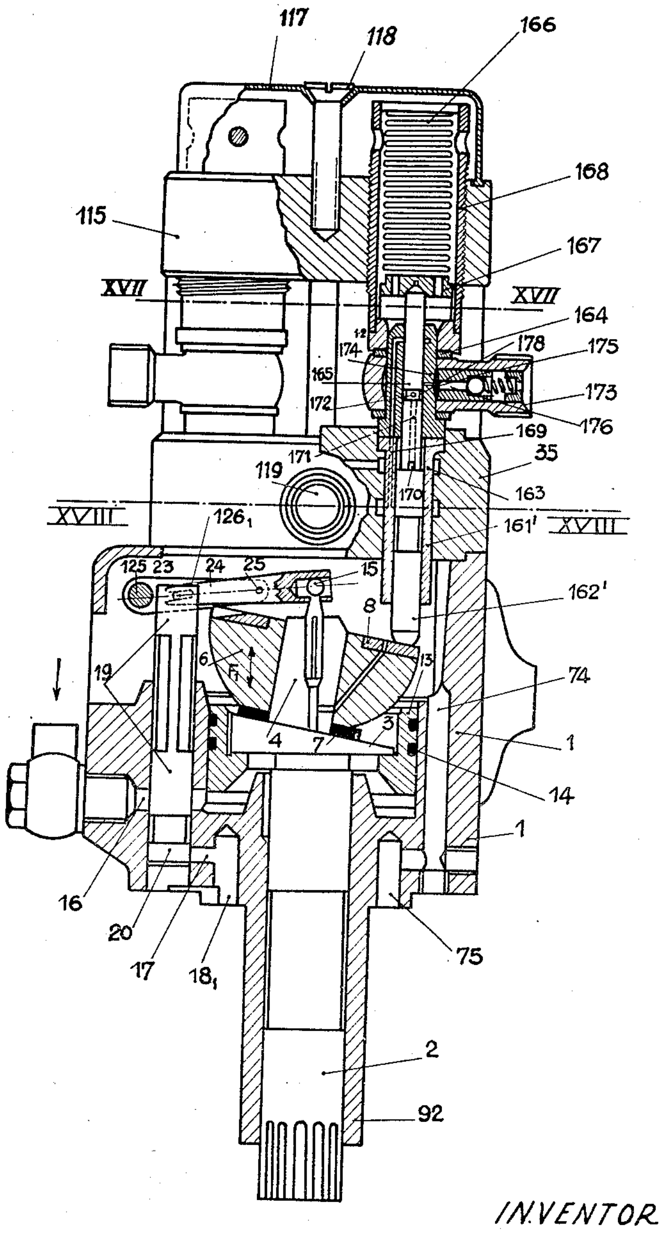
Figure 14 is a sectional elevational longitudinal view showing a second embodiment of the injection pump.

Each pump body comprises two superposed cylinders 161′ and 164 (Figure 14).

The cylinder 161′ of the injection pump is provided with a suction piston 162′. The lowermost position of the upper edge of this piston 162′ lies level with the suction openings 163 for the full admission. The delivery cylinder 164 is provided with a delivery plunger 165 the diameter of which is slightly smaller than that of the suction piston 162′. Said delivery plunger 165 rests upon the suction piston 162′ under the action of a compression spring 166 acting upon the cup 167 terminating the plunger 165. The cylinders 161′ and 164 are maintained applied against each other by a socket 168 forming at the same time an assembly screw for both cylinders and a housing for the spring 166.

Between the delivery plunger 165 and the inner wall of the delivery cylinder 164 is provided an annular chamber, the volume of which is variable according to the position in height of the delivery plunger 165 in said suction cylinder 161′ controlled by the displacements of the suction piston 162.

Said annular chamber 169 communicates with the delivery pipe 173 by a diametral groove 170 provided in the lower part of the delivery plunger 165 and then by the axial passage 171 provided in the centre of the plunger 165 and opening into a radial port 172.

The delivery cylinder 164 is provided with a plurality of radial conduits 174, $174^1$, $174^2$ converging towards a chamber 175 into which opens the conduit 176 of the delivery pipe 173.

Said injection pump works in the following manner:

Each suction piston 162′ is actuated by the oblique plate 6 in the previously described manner and thus receives a reciprocating movement according to the arrow $F_1$.

During the upward movement of the suction piston 162′ which controls the rising of the plunger 165 the circular groove 178 of the plunger 165 comes successively into contact with the different conduits 174, $174^1$, $174^2$ establishing the communication with the delivery pipe 173.

Said circular groove 178 receives the fuel contained in the annular chamber 169 communicating with the suction opening 163. Said fuel passes from the annular chamber 169 through the groove 170, the passage 171 and the hole 172 till the circular groove 178. The fuel is thus forced into the delivery pipe 173, first into the conduit 174, then through the conduit $174^1$ and finally through the conduit $174^2$. During the passage from a conduit 174 to the other $174^1$ the fuel which cannot flow out but which is further compressed by the movement of the suction piston 162 raises the plunger 165 while compressing its spring 166 until the circular groove 178 comes to lie opposite a conduit 174¹. At this moment the annular chamber 169 discharges its content, as described previously, through the groove 170, the passage 171, the groove 172 and the circular groove 178.

The delivery plunger 165 returns immediately into contact with the suction piston 162′ for being raised again under a new compression of the liquid fuel when the conduit 174 is closed. Thus, the injection takes place in pulsations the number of which is equal to that of the conduits 174.

The adjustment of the output of every pump body is obtained by the sliding movement of the oblique plate 6 which controls the movement of the plunger pistons 162′.

This adjustment is obtained in a similar manner as the adjustment of the previously described injection pump through the displacement of a piston 13. The piston 13 does not rotate with the driving shaft 2. It is provided with tightening piston rings 14 applied against the wall of the cylinder formed of a bore in the pump body 1. The flange 3 of shaft 2 rests on the bottom of piston 13 through an annular surface forming a sliding seat. It is constantly in contact with the oil from chamber 90 and rotates while the piston 13 is held fast through the adhesion of its piston rings 14. The flow of oil controlled by the distributing slide-valve 19 and entering the chamber 90 raises the piston 13. The latter carries with it the shaft 2 by its flange 3. The surface offered to the oil pressure by said flange is less than that which is offered by the piston. On the other hand, the return springs of the pump pistons always tend to return the rocking plate 6 and then the shaft 2 downwardly and hence the piston 13 through the flange 3. Owing to this fact the flange 3 is constantly applied onto its resting surface of piston 13.

The connection between the manometric diaphragm 140 controlling the partial vacuum of the engine with the distributing slide-valve 19 is effected in the following manner (Figures 15 and 16).

The bellow-shaped manometric diaphragm 140 is secured to a cylindrical bottom 141 serving as a guide for the rod 142. Said rod 142 transmits the elongations of the diaphragm to a rocking beam formed of two arms 128, 128¹. The bottom 141 is centered in a bore of the pump body. It is held fast by a hollow screw 145 having a conical end connected with the partial vacuum of the engine. For this purpose, a tube connected with a venturi in the suction pipe of the engine comes into communication with the end of the passage 147 of the hollow screw 145 and communicates through the passage 146 with the inside of the manometric diaphragm 140.

The movements of the diaphragm are transmitted to the rod 142 and then to both arms of the beam 128 and 128¹. Both said arms transmit their displacement to the pivoting shaft 125 through the brace 130 connecting both arms 128, 128¹. Said brace 130 is pressed constantly under the thrust of the torsion spring 135 against the screw 131 screwed into the lever 127 fast with the shaft 125 through the pin 133. Said spring rests, on the one hand, on the shaft 125 through the adjusting sleeve 134 and, on the other hand, on the arms 128, 128¹ through the opening 136.

Thus, the angular position of the beam formed of both arms 128 and 128¹ and the braces 129 and 130 can be modified at will by screwing or unscrewing the adjustment screw 131.

At that end of the shaft 125 which is opposed to that where the lever 127 is secured another rocking beam 126, 126¹ transmit the rocking movements of the shaft 125¹ to the slide-valve 19. For this purpose the beam 126, 126¹ is linked at 25 on a rocker 24, an end of which rests on the top of the driving shaft 2 by the ball 15 fitted into the latter. The other end of the rocker 24 straddles the pin 23 driven into the upper part of the distributing slide-valve 19.

Thus, the adjusting screw 131 makes it possible to adjust any position of the slide-valve according to the position of the rod 142 of the diaphragm and, therefore, the slowing down of the engine can be adjusted during the working of the latter. The screw 131 is always maintained tensioned on its threads in order to avoid its loosening. To this end, the lever 127 is slit in the part where the screw is located. After tapping the hole adapted for receiving said screw the slot 159 is slightly opened by a permanent deformation; when the screw is put in position it brings both edges of the slot nearer to each other and thus causes a tension which brakes the threads of the screw.

The control rod 142 can be submitted to the action of a compensating spring 200 which is adjustable for modifying the sensibility of the manometric diaphragm 140. The adjustment of said compensating spring 200 can be effected in the same manner as previously described by means of a strap and a conical screw.

According to another form of operation, a tension spring is wound around the shaft 125; an end of said spring rests against an adjusting tension washer secured by screws on the shaft 125 and the other end is taken by a clamping sleeve fast with the pump body and holding fast a more or less large number of turns of the spring.

For adjusting the optimum position for starting, a stop similar to that of the previously described injection pump is located behind the lower end of the lever 127. Said stop prevents said lever 127 of taking the uttermost position which would be imparted to it by the manometric diaphragm 140 at the moment of the start.

The stopping of the injection pump is obtained in the folling manner (Figures 15 and 16).

The end of a Bowden cable 150 passes through the notch 132 of the lever 127 and terminates in a mushroom, the diameter of which is larger than the width of the slot 132. During the working of the engine the mushroom of the cable is always out of contact with the lever 127. By pulling the cable the lever 127 is returned to the left in Figure 18. The screw 131 leaves the brace 130 of the rocking beam 128, 128¹ which is retained by the diaphragm 140, the latter being always influenced by the partial vacuum of the engine. The torsion spring 135 is bent during the time in which the rocking beam 128, 128¹ fast with the lever 127 urges the rocker 24 and the slide-valve 19 downwardly. The evacuation passages 17 evacuate the oil from the chamber 90 and deliver it outside. The piston 13 moves downwards again under the action of the springs 113 and of the pump pistons 106 which no longer extend beyond the inlet ports for the admission of the fuel to their upper dead centre. Thus the injection is stopped.

The sockets 168 of each pump body are screwed onto an upper housing 115. A bonnet 117 covers said housing 115 to which it is secured by a central screw 118.

I claim:

1. In an injection pump, a housing, parallel cylinders arranged at equal distances around a common axis in said housing, respective inlet and outlet orifices for the delivery of liquid in said cylinders, plunger pistons, for the delivery of liquid, sliding in said cylinders, a driving shaft, an oblique plate fast with said driving shaft and turning about its center under the effect of the rotation of said driving shaft and controlling the reciprocating movement of said plunger pistons, the ends of said pistons abutting against the oblique part of said plate, a deformable member, the deformation of said member controlling the regulation of the quantity of liquid to be injected, an additional cylinder, means sliding in said additional cylinder controlling the axial displacement of said oblique plate, means for leading oil under pressure into said additional cylinder for controlling the axial displacement of said oblique plate, a distributing member controlling the distribution of oil under pressure in said additional cylinder, and means for controlling said distributing member simultaneously in dependency on the deformation of said deformable member and the initial axial position of said oblique plate.

2. In an injection pump, a housing, parallel cylinders arranged at equal distances around a common axis in said housing, respective inlet and outlet orifices for the delivery of liquid in said cylinders, plunger pistons, for the delivery of liquid, sliding in said cylinders, a driving shaft, an oblique plate fast with said driving shaft and turning about its center under the effect of the rotation of said driving shaft and controlling the reciprocating movement of said plunger pistons, the ends of said pistons abutting against the oblique part of said plate, a deformable member, the deformation of said member controlling the regulation of the quantity of liquid to be injected, an additional cylinder, means sliding in said additional cylinder controlling the axial displacement of said oblique plate, means for leading oil under pressure into said additional cylinder for controlling the axial displacement of said oblique plate, a distributing member controlling the distribution of oil under pressure in said additional cylinder, an element axially fast with said oblique plate, a rocker articulated to said element, a system of articulated levers, one end of said system being articulated to said deformable member and the other end being articulated to said rocker, and a rod controlling said distributing member and articulated to the end of said rocker.

3. In an injection pump, a housing, parallel cylinders arranged at equal distances around a common axis in said housing, respective inlet and outlet orifices for the delivery of liquid in said cylinders, plunger pistons, for the delivery of liquid, sliding in said cylinders, a driving shaft, an oblique plate fast with said driving shaft and turning about its center under the effect of the rotation of said driving shaft and controlling the reciprocating movement of said plunger pistons, the ends of said pistons abutting against the oblique part of said plate, a deformable member, the deformation of said member controlling the regulation of the quantity of liquid to be injected, an additional cylinder, means sliding in said additional cylinder controlling the axial displacement of said oblique plate, means for leading oil under pressure into said additional cylinder for controlling the axial displacement of said oblique plate, a distributing member controlling the distribution of oil under pressure in said additional cylinder, an element axially fast with said oblique plate, a lever having a point of oscillation, one end of said lever being articulated to said deformable member, a rod having one end articulated to the other end of said lever, the other end of said rod being articulated to a point of said rocker, and a rod controlling said distributing member and articulated to the end of said rocker.

4. In an injection pump, a housing, parallel cylinders arranged at equal distances around a common axis in said housing, respective inlet and outlet orifices for the delivery of liquid in said cylinders, plunger pistons, for the delivery of liquid, sliding in said cylinders, a driving shaft, an oblique plate fast with said driving shaft and turning about its center under the effect of the rotation of said driving shaft and controlling the reciprocating movement of said plunger pistons, the ends of said pistons abutting against the oblique part of said plate, a deformable member, the deformation of said member controlling the regulation of the quantity of liquid to be injected, an additional cylinder, means sliding in said additional cylinder controlling the axial displacement of said oblique plate, means for leading oil under pressure into said additional cylinder for controlling the axial displacement of said oblique plate, a distributing member controlling the distribution of oil under pressure in said additional cylinder, an element axially fast with said oblique plate, a lever having a point of oscillation, one end of said lever being articulated to said deformable member, means for controlling the position of the point of oscillation of said lever, a rod having one end articulated to the other end of said lever, the other end of said rod being articulated to a point of said rocker, and a rod controlling said distributing member and articulated to the end of said rocker.

5. In an injection pump, a housing, parallel cylinders arranged at equal distances around a common axis in said housing, respective inlet and outlet orifices for the delivery of liquid in said cylinders, plunger pistons, for the delivery of liquid, sliding in said cylinders, a driving shaft, an oblique plate fast with said driving shaft and turning about its center under the effect of the rotation of said driving shaft and controlling the reciprocating movement of said plunger pistons, the ends of said pistons abutting against the oblique part of said plate, a deformable member, the deformation of said member controlling the regulation of the quantity of liquid to be injected, an additional cylinder, means sliding in said additional cylinder controlling the axial displacement of said oblique plate, means for leading oil under pressure into said additional cylinder for controlling the axial displacement of said oblique plate, a distributing member controlling the distribution of oil under pressure in said additional cylinder, an element axially fast with said oblique plate, a lever having a point of oscillation, one end of said lever being articulated to said deformable member, a yoke receiving the rocking axis of said lever, a fixed support on which said yoke slides, a threaded rod secured to said yoke, a control knob, a second threaded rod on said fixed support of said yoke, the pitches of the thread of said rods being different so that the displacement transmitted to said yoke while turning said knob is a function of the difference of the pitches which permits a simple infinitesimal adjustment, a rod having one end articulated to the other end of said lever, the other end of said rod being articulated to a point of said rocker, and a rod controlling said distributing member and articulated to the end of said rocker.

6. In an injection pump, a housing, parallel cylinders arranged at equal distances around a common axis in said housing, respective inlet and outlet orifices for the delivery of liquid in said cylinders, plunger pistons, for the delivery of liquid, sliding in said cylinders, a driving shaft, an oblique plate fast with said driving shaft and turning about its center under the effect of the rotation of said driving shaft and controlling the reciprocating movement of said plunger pistons, the ends of said pistons abutting against the oblique part of said plate, a deformable member, the deformation of said member controlling the regulation of the quantity of liquid to be injected, an additional cylinder, means sliding in said additional cylinder controlling the axial displacement of said oblique plate, means for leading oil under pressure into said additional cylinder for controlling the axial displacement of said oblique plate, a distributing member controlling the distribution of oil under pressure in said additional cylinder, an element axially fast with said oblique plate, a lever having a point of oscillation, one end of said lever being articulated to said deformable member, a yieldable stop arresting said deformable member for controlling small deliveries, means permitting the action of said yielding stop on said lever, a rod having one end articulated to the other end of said lever, the other end of said rod being articulated to a point of said rocker, and a rod controlling said distributing member and articulated to the end of said rocker.

7. In an injection pump, a housing, parallel cylinders arranged at equal distances around a common axis in said housing, respective inlet and outlet orifices for the delivery of liquid in said cylinders, plunger pistons, for the delivery of liquid, sliding in said cylinders, a driving shaft, an oblique plate fast with said driving shaft and turning about its center under the effect of the rotation of said driving shaft and controlling the reciprocating movement of said plunger pistons, the ends of said pistons abutting against the oblique part of said plate, a deformable member, the deformation of said member controlling the regulation of the quantity of liquid to be injected, an additional cylinder, means sliding in said additional cylinder controlling the axial displacement of said oblique plate, means for leading oil under pressure into said additional cylinder for controlling the axial displacement of said oblique plate, a distributing member controlling the distribution of oil under pressure in said additional cylinder, an element axially fast with said oblique plate, a lever having a point of oscillation, one end of said lever being articulated to said deformable member, a yieldable stop arresting said deformable member for controlling small deliveries, a Bowden cable actuating said yieldable stop, a rod having one end articulated to the other end of said lever, the other end of said rod being articulated to a point of said rocker, and a rod controlling said distributing member and articulated to the end of said rocker.

GERMAIN LAGARDELLE.

REFERENCES CITED

The following references are of record in the file of this patent:

UNITED STATES PATENTS

| Number | Name | Date |
|---|---|---|
| 2,087,233 | Alden | July 20, 1937 |
| 2,393,544 | Lum | Jan. 22, 1946 |
| 2,405,938 | Beeh | Aug. 20, 1946 |